(12) United States Patent
Viles et al.

(10) Patent No.: US 10,291,942 B2
(45) Date of Patent: May 14, 2019

(54) INTERACTIVE BROADCAST SYSTEM AND METHOD

(71) Applicant: NBCUniversal Media, LLC, New York, NY (US)

(72) Inventors: Aimee Beth Gariepy Viles, Seattle, WA (US); Keith Andrew Jackson, Hillsdale, NY (US); Kelly McSweeney, Manhattan, NY (US); Michael George Duemo, New Milford, NJ (US); Kevin Mercurio, Pearl River, NY (US); Michael Wang, Harrison, NY (US)

(73) Assignee: NBCUniversal Medial, LLC, New York, NY (US)

( * ) Notice: Subject to any disclaimer, the term of this patent is extended or adjusted under 35 U.S.C. 154(b) by 0 days.

(21) Appl. No.: 13/826,031

(22) Filed: Mar. 14, 2013

(65) Prior Publication Data
US 2014/0282650 A1 Sep. 18, 2014

(51) Int. Cl.
*H04N 21/234* (2011.01)
*G06Q 30/02* (2012.01)
*H04N 21/239* (2011.01)
*H04N 21/478* (2011.01)
*H04N 21/81* (2011.01)
*H04N 21/475* (2011.01)

(52) U.S. Cl.
CPC ....... *H04N 21/23424* (2013.01); *G06Q 30/02* (2013.01); *H04N 21/2393* (2013.01); *H04N 21/4758* (2013.01); *H04N 21/4781* (2013.01); *H04N 21/812* (2013.01); *H04N 21/8146* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,240,555 B1 * | 5/2001 | Shoff | | H04N 5/44543 348/E5.104 |
| 8,046,797 B2 * | 10/2011 | Bentolila | | G06Q 30/0251 705/14.49 |
| 8,073,013 B2 * | 12/2011 | Coleman | | G06Q 30/02 370/486 |
| 8,516,528 B2 * | 8/2013 | Sandoval | | H04N 5/06 725/131 |
| 8,555,327 B2 * | 10/2013 | Oztaskent | | H04N 21/8586 725/112 |
| 2002/0129364 A1 * | 9/2002 | Smith | | H04N 7/088 725/37 |

(Continued)

FOREIGN PATENT DOCUMENTS

WO WO 2007010416 A2 * 1/2007 ............. H04H 20/28

*Primary Examiner* — Alexander Gee
(74) *Attorney, Agent, or Firm* — Fletcher Yoder, P.C.

(57) ABSTRACT

An interactive system and method allow for broadcast of basic content data along with data that define graphical inserts that can be played with or super-imposed on screens of the decoded broadcast. Coordinated pages or screens may be transmitted to audience secondary devices, such as smart phones, tablet computers, and so forth. Audience members may participate in an interactive experience by selecting options provided on the secondary devices. Audience responses are received, aggregated, and rules applied in accordance with the desired experience. The graphical indicia are altered during the broadcast, and optionally during or just following a period for audience feedback.

27 Claims, 7 Drawing Sheets

(56) References Cited

U.S. PATENT DOCUMENTS

| | | | |
|---|---|---|---|
| 2002/0194592 A1* | 12/2002 | Tsuchida | H04H 20/10 725/32 |
| 2005/0289622 A1* | 12/2005 | Vanlerberghe et al. | 725/100 |
| 2008/0059997 A1* | 3/2008 | Plotnick | G11B 27/005 725/32 |
| 2008/0282286 A1* | 11/2008 | Or | 725/34 |
| 2008/0297669 A1* | 12/2008 | Zalewski | H04N 7/163 348/844 |
| 2009/0150940 A1* | 6/2009 | St.John-Larkin | H04N 7/17318 725/59 |
| 2010/0131975 A1* | 5/2010 | Landow | H04H 20/106 725/34 |
| 2011/0289532 A1* | 11/2011 | Yu | H04N 21/4126 725/38 |
| 2012/0174155 A1* | 7/2012 | Mowrey | H04N 5/44543 725/40 |
| 2012/0254910 A1* | 10/2012 | Donoghue | H04H 60/31 725/14 |
| 2013/0152135 A1* | 6/2013 | Hong et al. | 725/51 |
| 2013/0174035 A1* | 7/2013 | Grab | H04N 21/4316 715/716 |
| 2013/0212620 A1* | 8/2013 | Bokor | G06F 3/017 725/32 |
| 2014/0068432 A1* | 3/2014 | Kucharz | G06Q 10/107 715/716 |
| 2014/0074621 A1* | 3/2014 | Chai | G06O 30/0251 705/14.66 |
| 2014/0125866 A1* | 5/2014 | Davy | H04N 21/41415 348/462 |
| 2014/0215508 A1* | 7/2014 | Wyatt | H04N 21/4758 725/24 |
| 2014/0229975 A1* | 8/2014 | Bolden | H04N 21/4126 725/32 |
| 2014/0280695 A1* | 9/2014 | Sharma | H04L 67/1095 709/217 |

* cited by examiner

INTERACTIVE BROADCAST SYSTEM AND METHOD

BACKGROUND

The invention relates generally to the coordinated experience of broadcast video and audio content played on one device with interactive interfaces on provided on separate devices accessible to a viewing and listening audience.

The advent of separate and generally parallel content transmission media has recently led to many interesting concepts in the construction of coordinated experiences. For example, many television broadcasts have long invited viewers to "call in" or otherwise to visit websites, or to access content on other devices, such as smart phones, desktop and laptop computers, tablet computers, or even on the televisions themselves, where these are capable of such operations. To enhance the audience experience, the additional information provided on the parallel devices is often complimentary or in some way supplementary of the programming provided on the first device (e.g., a television set). Such complimentary content may include, for example, information relating to the program, performers, background stories, and so forth. In commercial contexts, the content may relate to special offers, commercial discounts, or a wide array of innovative offerings that present the potential for monetization.

At the same time, very popular broadcasts have invited viewers to vote or otherwise to participate in audience-influenced aspects of shows, such as by voting a contestant in a reality television show to continue or, conversely, to be dropped from a competition. In general, such voting is highly data-intensive, and current technologies have some difficulty in coping with the sudden and punctual influx of data in response to the programs. Little or no real apparent progress has been made in providing "real time" or program-relevant feedback from such audience interactions. As used herein the term "real time", while permitting some delay due to processing, transmission, coding and decoding, nevertheless connotes the provision of audience-perceptible feedback in a program-relevant manner, typically during a period allotted for the audience interaction, and in a way that may even allow the audience to alter the feedback as it develops and is delivered.

It would further enhance the field to develop systems and methods that permit more time-relevant interactive information in scenarios of this type. It is believed that such advancements might not only further improve the audience experience, but may offer a wide range of new paradigms for coordinated programming, advertisement, information gathering and sharing, and so forth.

BRIEF DESCRIPTION

The present invention provides methods and systems designed to respond to such needs. It may be applied to a wide variety of programming platforms and types, and will typically or initially be applied to a coordinated experience between television broadcasts and audience participation via various secondary devices, such as smart phones, tablet computers, laptop computers, and so forth. The techniques allow for aggregation of feedback, and application of rules defining the experience, as well as for alteration of the graphical indicia during the broadcast, and even during or just following a period allocated for audience participation. The resulting scheme allows for many different and innovated scenarios for audience participation. The feedback from the audience may also be used to alter or affect the actual program (i.e., underlying basic content), such as during "live" broadcasts.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
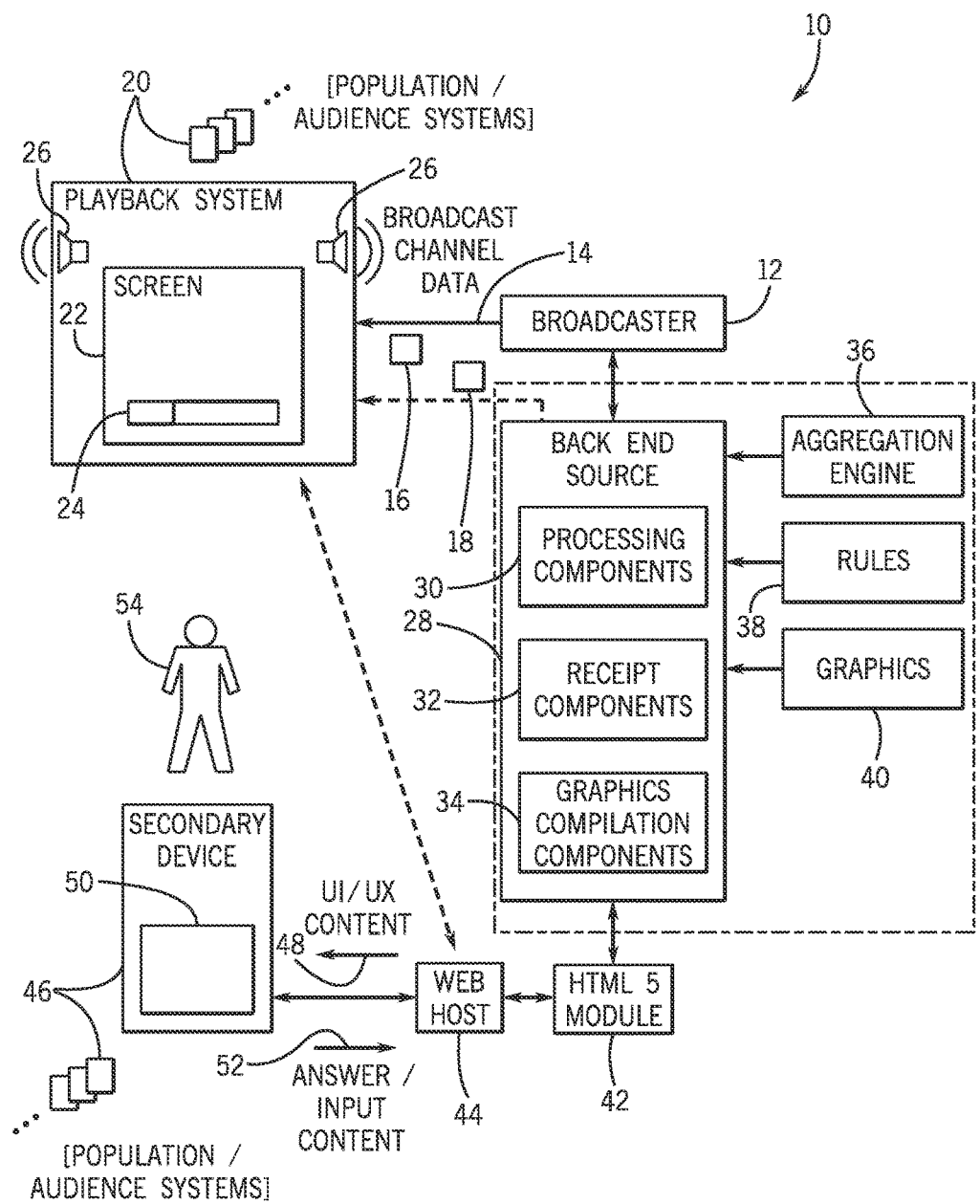
FIG. 1 is a diagrammatical representation of an exemplary system for allowing broadcast and interactive participation by an audience.

FIG. 1 illustrates an exemplary system 10 for providing an interactive experience to an audience based upon a broadcast and upon complimentary or supplementary data exchanged with an audience. The system 10 is illustrated as including a broadcaster 12 that provides a broadcast stream 14. In many cases the broadcast will be made in accordance with a pre-established broadcast schedule, such as a television schedule. The broadcast itself may be made through any suitable medium, such as the airwaves, cable media, satellite media, Internet television (IPTV) media, or a combination of these. In many contexts, the broadcast will be made in accordance with an established broadcast protocol that allows for uni-directional transmission of the broadcast stream 14 from the broadcaster 12 to the receiving devices. It should be further noted that more than one broadcaster may participate as described below, and a single broadcaster may broadcast multiple different programs. The broadcaster itself may include various entities, including content suppliers, broadcast and transmission networks, coding entities, transmission entities, and so forth. In the present context, all of these may be grouped into the "broadcaster" component 12.

The broadcast stream 14 will include basic content data 16 as well as graphic insert data 18. The basic content data will consist, for example, of the normal programming provided by the broadcaster, such as a television program, intermittent advertisements, paid programming, pay-per-view programming, and so forth. The graphic insert data 18 comprises visual and/or auditory components that may be superimposed on the basic content, such as to provide pictures, text, and so forth on a portion of the receiver. The graphic insert data and the basic content data may be integrated in any suitable manner, and in presently contemplated embodiments, the graphic insert data comprises a flash stream that defines desired graphics to be displayed with or over scenes defined by the basic content data.

The broadcast streams are directed to and may be received by one or more playback systems 20. The playback systems may include devices such as television sets, Internet-ready television sets, a set-top boxes, computers of various types, and so forth. In general, such playback systems will include components capable of receiving the broadcast and decoding the broadcast for play to an audience. In the illustrated embodiment, for example, the playback system comprises a television set having a display 22. The display may, in a generally conventional manner, present viewable screens that, together, define visual content, such as pre-recorded programs, live programs, commercial content, and so forth. Graphical indicia 24 may be provided over these screens and both initiate and update interactions with the audience as described below. In most cases the playback system will also include one or more speakers 26 for audio components of the broadcasts.

As further illustrated in FIG. 1, a "back end source" 28 provides certain portions of the broadcast stream, most notably the graphic insert data, which again may be provided in the form of a flash stream. Where the back end source 28 is separate from the broadcaster 12 (the two may, in some cases, be integrated) it will generally have one or more process components 30, receipt components 32, and graphics compilation components 34. The processing components allow the back end source, among other things, to process data received from the audience, as described below, to apply rules to the received data, to aggregate the data, and so forth. Such processing components may include, for example, one or more general purpose or specially-adapted computers or processors. In many situations, more complex or devoted computer systems or system resources will be used, which may be situated at the same or different geographic locations and operate in coordination with one another. The receipt components 32 allow for information to be received from the audience, as well as from the broadcaster where desired. Such received components may include routers, servers, and appropriate programming for receiving, storing, and advancing the data to be processed. The graphics compilation components 34, some which may be included as firmware or as programming software executed by the processing components, may include components designed to allow for definition of the graphic insert data, adaptation of the graphic insert data as audience data is received and processed, and as the rules are applied as discussed below. In certain presently contemplated embodiments the graphic insert data, for example, allows for changes in the graphical indicia as certain audience information is received and processed. The graphics compilation components may also allow for dynamic or automated graphic capabilities (e.g., code script to make animations perform certain functions, movements, and so forth). In some cases, at least some of the graphics processing may also be performed at the receiver devices based upon data (e.g., code, parameters, etc.) transmitted in or in parallel with the basic content data.

The back end source includes or may access certain hardware, firmware, and software to perform the various functions described in the present disclosure. For example, as illustrated in FIG. 1, an aggregation engine 36 is provided that permits the receipt components and processing components to receive, parse, associate, and aggregate audience data received via additional devices as described below. Of particular interest, this aggregation function preferably takes place during the broadcast and more specifically may occur during specific time periods allowed for audience feedback. Rules 38 may be established and/or programmed into the back end source for altering the graphic insert data in such a way to produce changes in the graphical indicia during the broadcast, also a particularly powerful aspect of the techniques. In general, these rules will be closely associated with the particular graphical indicia, the purpose of the graphical indicia, and in most cases will be relevant to the programming defined by the basic content data. Such rules may allow, for example, for voting, alteration of offers or promotional materials, alteration of graphics or even the basic programming itself, and so forth. It is presently contemplated that many such rules and rule sets may be defined for different programs and different purposes, and the ability to aggregate incoming data and apply rules during a broadcast or a time allotted for audience feedback (i.e., "real time") constitutes aspects of the present techniques that will be especially suitable to expansion, refinement and adaptation for different purposes. Finally, certain graphics 40 may be predefined and applied by the back end source. Here again, graphics may be especially adapted to specific programs and purposes, particularly for information, presentation, presentation of commercial offers, allowing audience voting, and so forth.

In a presently contemplated embodiment, the back end source allows for a module to interact with the audience. In the embodiment illustrated in FIG. 1, this module 42 is defined as an HTML5 module. As will be appreciated by those skilled in the art, HTML5 is a markup language for structuring and presenting content. This particular standard is a current revision in the HTML standard. It is certainly contemplated that other modules, and further refinement of this standard will be made the future, and the system is not intended to be limited to HTML5, but may be easily adapted for use of such improvements. In the present context, the module permits interoperability in certain implementations, improves the markup available for documents and other data, and allows for application programming interfaces (APIs) for certain applications. Moreover, the modules allow for cross-platform mobile applications that are used for audience feedback. The module is made available to a web host 44 which may be a separate entity or incorporated at least partially with the back end source. The web host 44 allows for secondary devices 46 to request and be provided with user interface and user exchange (UI/UX) data or content 48. As in conventional Internet applications, the content 48 allows for interface screens 50 to be provided on the secondary device. Secondary devices may include, for example, smart telephones, tablet computers, laptop computers, or any other suitable device capable of requesting, receiving, and decoding the UI/UX content. The secondary device also permits the user to interact with it, such as via a keyboard or touch screen, and to provide feedback data as indicated at reference numeral 52. The feedback data will typically be encoded and packetized for sending to the web host 44. In many presently contemplated embodiments, the content 52 will include various replies, answers, votes, inputs, and more generally, interactive feedback from the audience.

The entire system 10 illustrated in FIG. 1 is designed to provide an interactive experience to audience members as indicated generally by reference numeral 54. In a typical scenario, the audience member will tune the playback system 20 to a particular broadcast, such as by selecting a "channel" in a conventional manner. In accordance with the broadcast schedule, then, pre-defined programming (or live programming) will be played on a playback system, in video, audio, or more commonly both. The graphical indicia 24 will, from time to time, be displayed on the screens and will typically be relevant to the subject matter then being played in the broadcast. The audience member 54 may then observe this indicia and tune or direct the secondary device to obtain complimentary or supplementary data from the web host. Because the UI/UX content is coordinated with the broadcast data, the secondary device will then be provided with data that permits video and/or audio to be played on the secondary device that is relevant to the graphical indicia on the primary device. The audience member may then interact with the secondary device and provide feedback data to the web host, which is processed by the back end source which, in turn, may alter the graphical indicia provided to the broadcaster. It may be noted in the illustration of FIG. 1, in certain present or future embodiments, the flash stream that defines the graphic insert data in the present embodiment may be provided directly by the back end source (and, as noted above, the broadcaster and back end source entities and functions may be integrated as well).

An option noted in FIG. 1 is for the web host to interact directly with the receiver device, as indicated by the broken line in the figure. That is, Internet (and other network) connectivity will increasingly be integrated into receivers and playback systems such as television sets. In such cases, certain interactions and data may be exchanged directly with the playback systems. Similarly, it should be borne in mind that the respective roles of the "primary" and "secondary" devices may be reversed from those shown, and this may occur during the time a broadcast is received and played, and feedback is provided by the audience. For example, "secondary" devices such as handheld devices, tablet computers, and so forth may increasingly be capable of receiving and playing broadcast content. In such cases, an audience member may sometimes watch a broadcast on a conventional television set, but may also or instead, watch on a "secondary" device, or switch devices during a broadcast. In such cases, the handheld device, tablet computer, and the like may be considered the "primary" device, and the television set the "secondary" device. Similarly, other components may certainly be included on the audience side, such as modems, routers, home or office networks, and the like, and the primary and secondary device may receive and exchange data via such components, or may serve themselves as one or more of these components. Finally, it should be appreciated that the present techniques allow for synchronization of the basic content, graphical indicia, and UI/UX data provided in ways both that have not been done in the art, and that were likely generally deemed unnecessary due to the absence of any "real time" or "during the broadcast" effect of audience feedback on the data or content provided.

It should also be noted that in addition to altering the graphical indicia, or instead of altering these indicia, the feedback data may be aggregated and rule processed, and results of analysis provided to the broadcaster to affect the actual basic content. Interestingly, such changes and influences may be made during a "live" broadcast. That is, where personalities or characters act or interact during a broadcast, their actions may be directed by the audience via the responses provided. Such scenarios may allow for, by way of example, audience polling and voting for one or a range of actions, changes in otherwise planned activities and plots, and so forth. Moreover, pre-recorded broadcasts may be similarly influenced by audience feedback during the broadcast time period, such as by audience-influenced selection of story endings, plot twists, and so forth.

Figure 2:
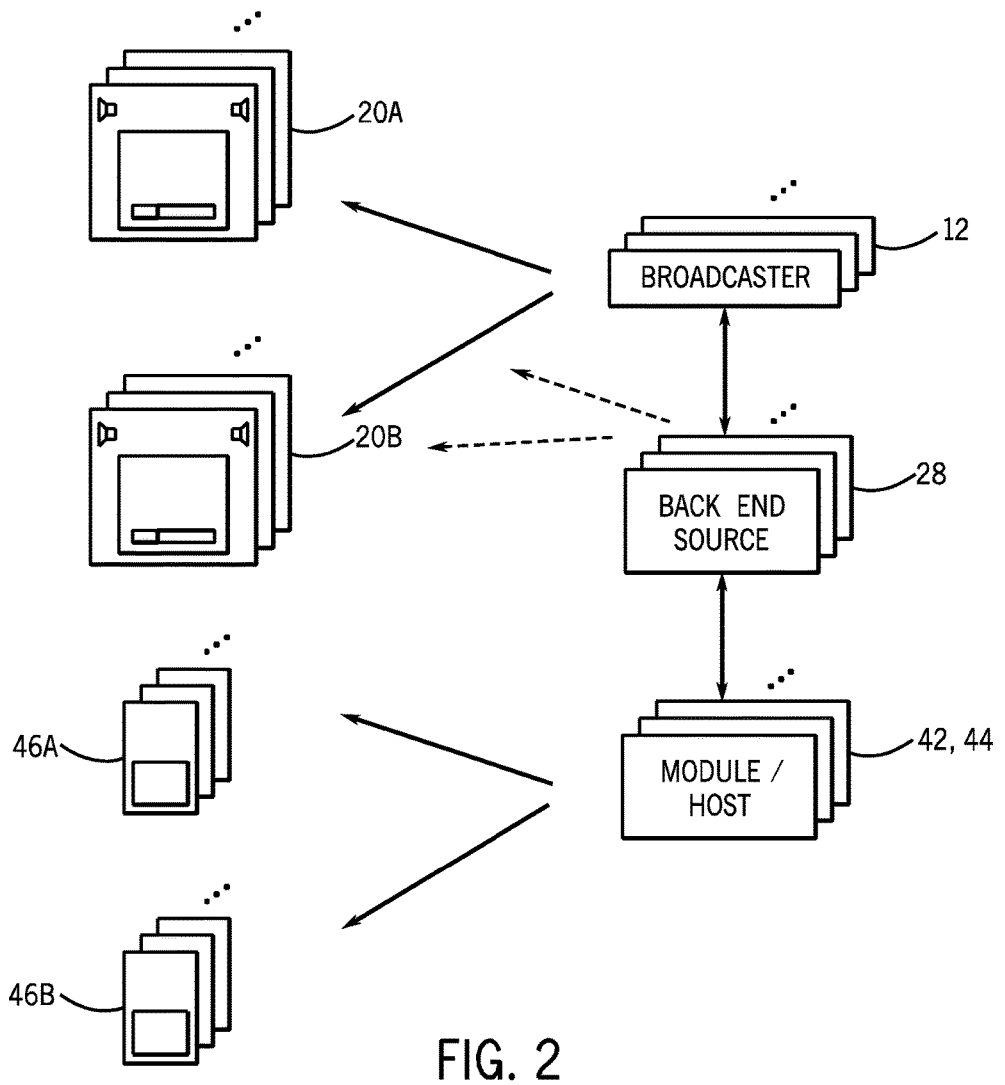
FIG. 2 is a diagrammatical illustration of a similar system in which multiple different programs are provided to interact with multiple different audiences.

As discussed above, the system may be adapted to permit certain of the same entities or components to service different programs, provide different graphical indicia, receive and process different audience feedback, and so forth. For example, as illustrated in FIG. 2, one or more broadcasters 12 may provide both basic content data and graphic insert data to different playback systems 20A and 20B that represent different audiences. That is, the audiences differ insomuch as they have tuned to different programming. The backend source 28 may similarly comprise one or more entities that service the broadcast insomuch as they provide different graphic insert data (typically adapted for the particular broadcast), and receive and process different inputs consistent with the information provided to a different set of secondary devices 46A and 46B. The interaction with the secondary devices may take place through one or more modules and hosts 42, 44. It is presently contemplated that the backend sources, in particular, may service a wide range of different programs, and where a single broadcaster provides programming on different channels that may be of interest to different audiences, these components may be grouped and parallel transmission, receipt, processing, aggregation, rule application, and graphical indicia alteration may occur.

Figure 3:
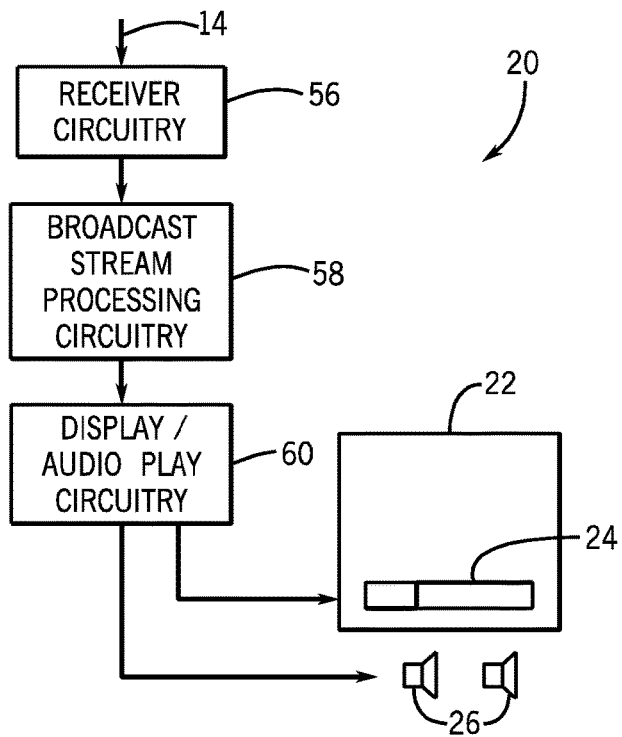
FIG. 3 is a diagrammatical representation of some of the functional components that may be included in a receiver device for use in the system.

FIG. 3 illustrates exemplary components that may be included in a playback system 20. In the illustration of FIG. 3 the broadcast stream 14 is received by receiver circuitry 56 which may include antennas, amplifiers, and any conventional circuitry for televisions, television receivers, set-top boxes, cable interfaces, satellite equipment, and so forth. The receiver circuitry will also typically allow for dialing or selecting particular channels among a range of pre-set channels available to the audience, such as at no cost over the airwaves, or by agreement or subscription. The broadcast stream processing circuitry 58 receives the broadcast stream then selected, and decodes the broadcast stream in a conventional manner. However, in the presently contemplated embodiment, where special or different processing is required for the graphic insert data, this data may be extracted and decoded separately. Display/audio play circuitry 60 then receives the decoded data and in accordance with the particular hardware platform provides signals to the display and speakers to reconstruct the programming. The reconstruction will also include definition, placement and typically super-imposition of the graphical indicia 24.

Figure 4:
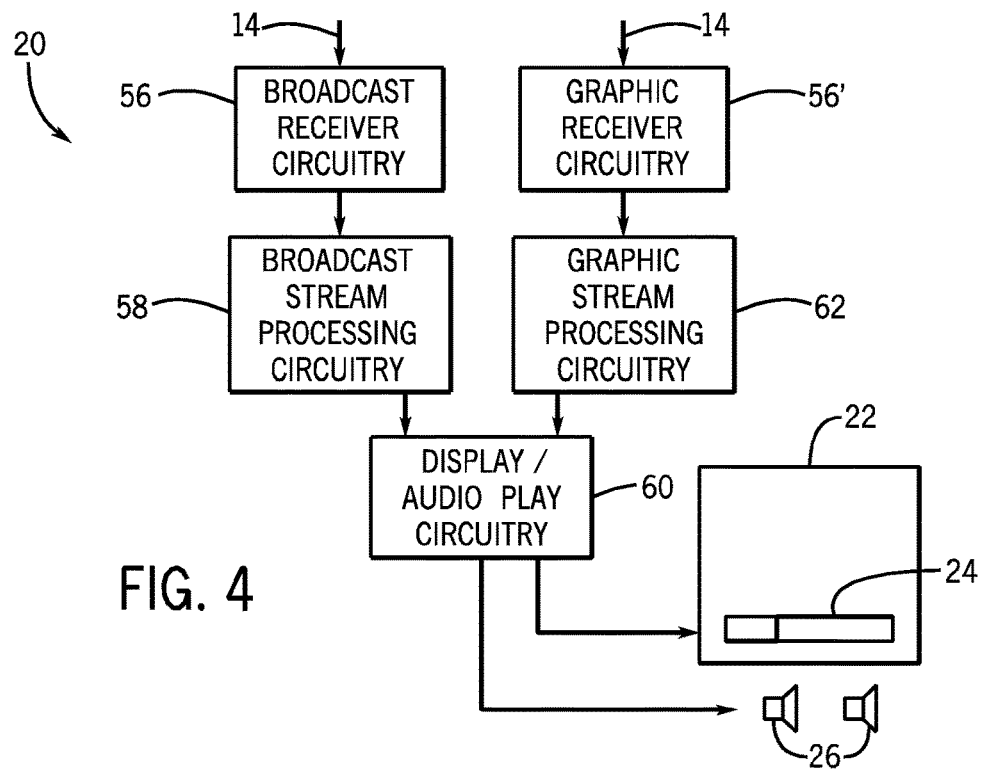
FIG. 4 is a diagrammatical representation of an alternative receiver device with separate components for handling broadcast streams and graphic streams.

In another scenario illustrated in FIG. 4, a separate portion of the broadcast stream may be received and processed by graphic receiver circuitry 56'. This scenario may be particularly relevant where the graphic insert data is transmitted in accordance with a different standard or is encoded differently from the basic content data in a broadcast stream. As mentioned above, in certain future embodiments the graphic insert data may even be provided completely separately from the basic content stream, including via a different medium or channel (e.g., the Internet). A further component 62 may be provided in such scenarios which allows for graphic stream processing. This processing will permit the graphic indicia to be reconstituted for integration into the screens by the display/audio play circuitry 60.

Figure 5:
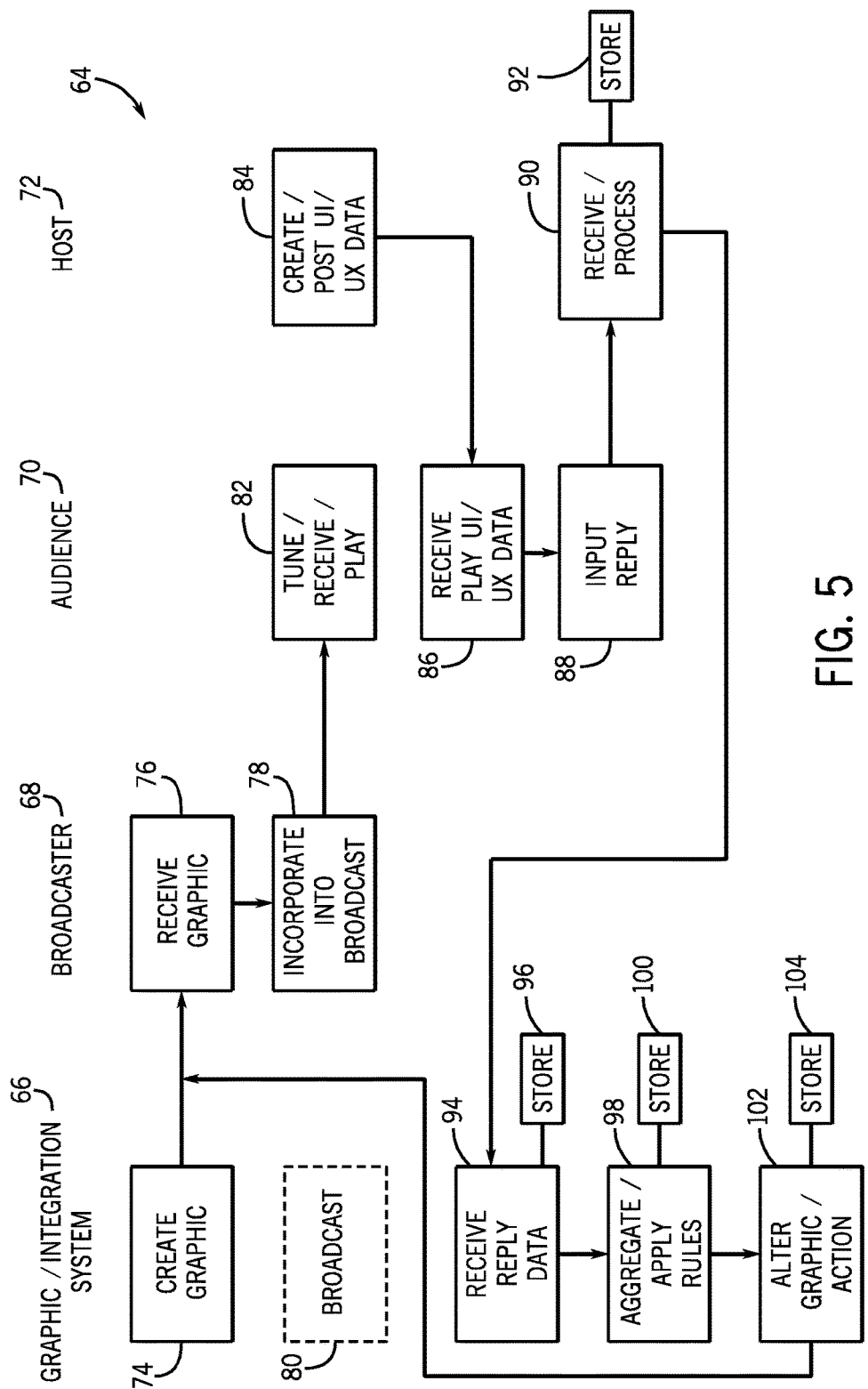
FIG. 5 is a flow chart illustrating exemplary activities of certain participants in the system in accordance with embodiments of a presently contemplated method.

FIG. 5 illustrates an exemplary process utilizing a system of the type described above for providing an interactive experience to a broadcast audience. The method is illustrated in the form of exemplary activities by different participants in the process. These include, in this illustration, the graphic/integration system 66, the broadcaster 68, the audience 70, and the web host 72. The graphic/integration system 66 itself may include, for example, the back end source and its various components as described above. The process may be thought of as initiating with the creation of a graphic as illustrated at step 74. In most practical embodiments, however, creation of the graphical indicia, creation of the underlying programming and other components of the broadcast stream will typically take place well in advance of the broadcast. That is, the content of interest to the audience, the informational content of the graphical indicia, the broadcast or transmission schedule, anticipated optional feedback, rules applied based on the feedback, changes to the graphical indicia in response to the aggregation and rules, and similar parameters will be defined well in advance. Even for "live" television, the graphical indicia, the aggregation and rules will be worked out in advance, and these will be ready and applied during the broadcast transmission. In many situations the graphical indicia, the aggregations and the rules, along with possible alterations of the graphical indicia will form part of a well-conceived range of possible activities and feedback that define the interactive experience, or at least the possible mapping of the experience depending upon audience reactions. These may permit, for instance, establishment of activities that are believed to be particularly of interest to the audience, advertising campaigns, promotional campaigns, and so forth. With the basic graphical indicia defined, it is transmitted from the back end source to the broadcaster and received as indicated at step 76. The broadcaster then incorporates this graphic content into the broadcast stream as indicated at step 78 and transmits it to a possible audience in accordance with one or more of various broadcast technologies as mentioned above.

The audience 70 then tunes to the particular broadcast as indicated at step 82, and receives and plays the basic content and the graphical indicia transmitted with the basic content in the broadcast stream. In parallel, a host creates and posts UI/UX data that is made available to the secondary devices mentioned above, as indicated at step 84. Here again, it should be noted that although the activities summarized in FIG. 5 indicate creation of this data, in many cases it will be created well in advance of the broadcast so as to be carefully coordinated with the graphical indicia provided to the audience (and the broadcast), as well as with the various activities anticipated for alteration of these graphical indicia. Upon request from the secondary devices, then, the UI/UX data is provided to the audience, received and played as indicated at step 86. In a typical scenario, an audience member may view a television program on a television set, observe the graphical indicia, tune to or "hit" a website (or application) corresponding to or indicated by the graphical indicia, and receive one or more web pages. In response to the UI/UX data provided to the secondary device, then, the audience member may interact or input reply data as indicated at step 88. Here again, this will typically be done via a keyboard, touch screen, or other user interface on or associated with the secondary device. The reply data is then encoded and sent back to the web host where it is received and processed as indicated at step 90. At this point and at many other points during the method, the host may store certain information, such as the IP address of the audience member secondary device, the particular response made, the time and date, any identifying information available for the user, the program or query to which the user is responding, and so forth. Such data may be mined at a subsequent stage to provide an enhanced experience to the user.

The received and process data may then be received by the graphic/integration system for further processing, as indicated at step 94. Here again, certain information relating to the user, the programming and the feedback may be stored at step 96. Based upon the pre-set purpose and nature of the scheme, then, aggregation may be performed and rules applied as indicated at step 98. Certain resulting information will generally be stored at step 100. For example, a key part of most schemes utilizing the techniques will be to provide "real time" audience feedback via the graphical inserts (e.g., audience voting, popularity of contestants, product selections, etc.). This information will be stored for immediate and later reference in adjusting the graphical inserts and for analysis of the programming and interactive experience. Finally, at step 102, the graphical insert may be altered in accordance with the audience feedback, the aggregation and the rules applied. These changes will again be stored at step 104. The changed graphic insert data will then be provided back to the broadcaster so that the data decoded and viewed by the audience is changed accordingly during the broadcast and even during specified periods for response.

Figure 6:
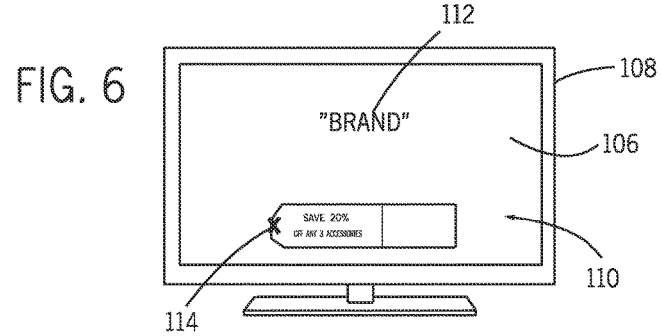
FIGS. 6-8 illustrate a first example of an interactive experience presented to an audience in accordance with the system and method.
Figure 7:
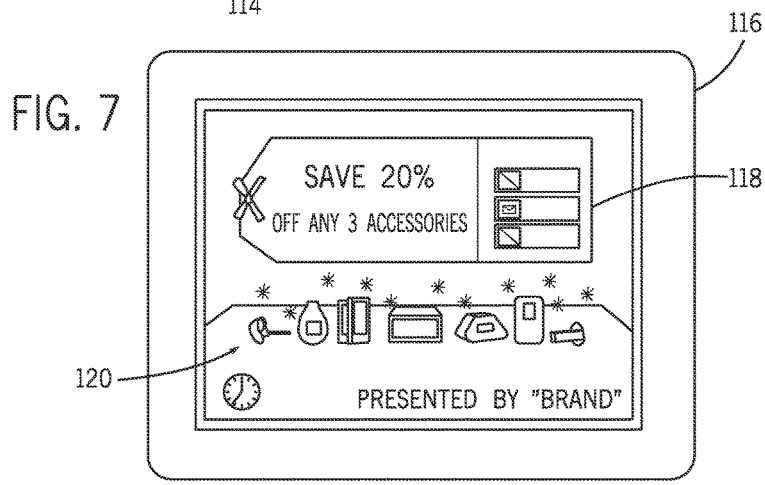
Figure 8:
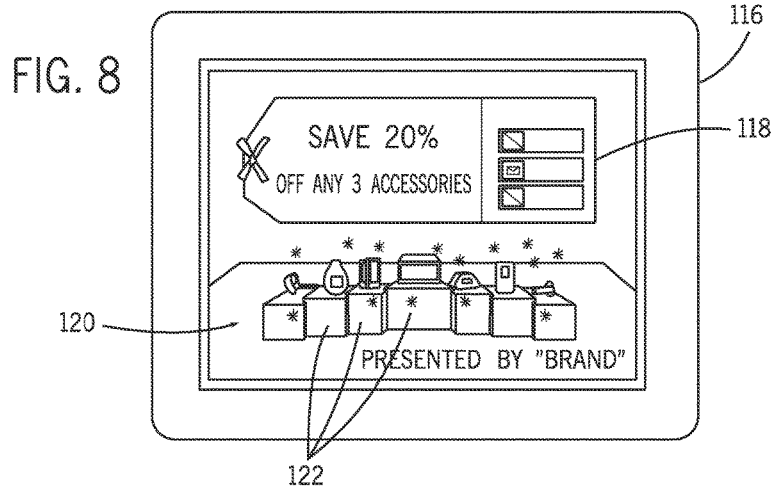
Figure 9:
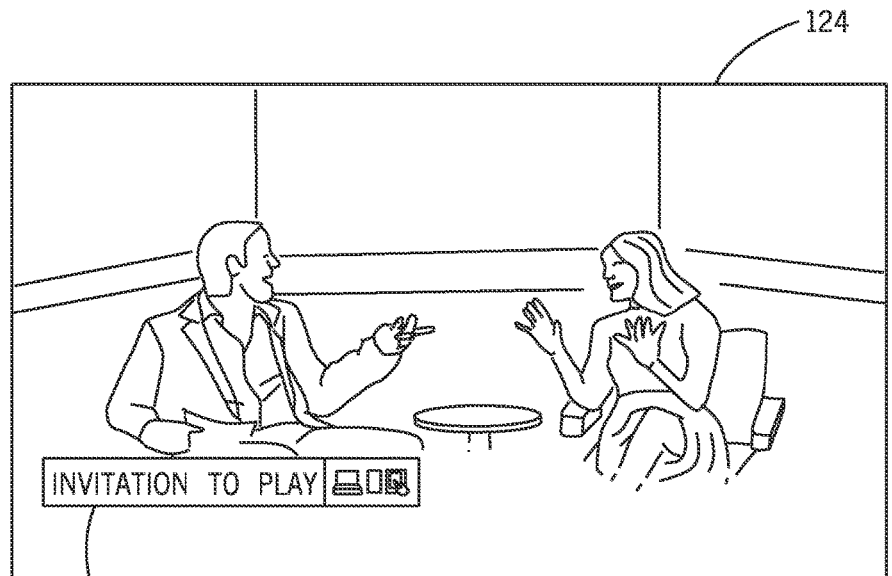
FIGS. 9-12 illustrate another example of an interactive experience utilizing several different devices or platforms.

FIGS. 6-8 provide an example of an experience offered by the present techniques. In particular, FIG. 6 illustrates a screen 106 on a television monitor 108. The screen may actually include one or more scenes of a program to which the audience member has tuned. Graphical indicia 110 are super-imposed on the screen, and this may include an indication of a "brand" or company sponsor of a commercial offer, in this example. The graphical indicia itself may define, for example, an indication to vote for one or more products, as indicated by reference numeral 114. However, it should be borne in mind that many different forms and purposes for such graphical indicia may be envisioned, depending upon the nature and purpose of the interactive experience in mind. FIG. 7 shows an exemplary page that could then be displayed on a secondary device, such as a tablet computer 116. The page 118 may include, for example, more detailed information or identification of selections available for selection, as indicated by reference numeral 120. In this case, several products are shown, with the rules allowing for discounts on certain of these, depending upon audience feedback (e.g., popularity of the selections). As shown in FIG. 8, then, graphics may be altered on the secondary device page, as indicated by reference numeral 120. In this case, the size, order, color or any other aspect of the selections, positions of the selections, additional graphics associated with them, words, offers and so forth may be altered to indicate the aggregation and rules applied to the feedback from multiple audience members. Although not separately shown, it is contemplated that similar graphical insert changes would be conveyed to the televisions and displayed on the monitors. Again, such changes may be made during the broadcast, or even during specified times for response by audience members (e.g., 30 seconds allowed for voting). In some cases it may be desirable to enhance the experience by delaying presentation of the altered graphical indicia, while in others the indicia will be changed during receipt, aggregation, rule application and presentation. It should also be noted that in many cases an indication of time permitted for responses may be provided, such as in the form of a simulated clock (not shown), digits counting up or down, a time line (or "slider"), an auditory signal (e.g., simulated clock tick), and so forth.

Figure 10:
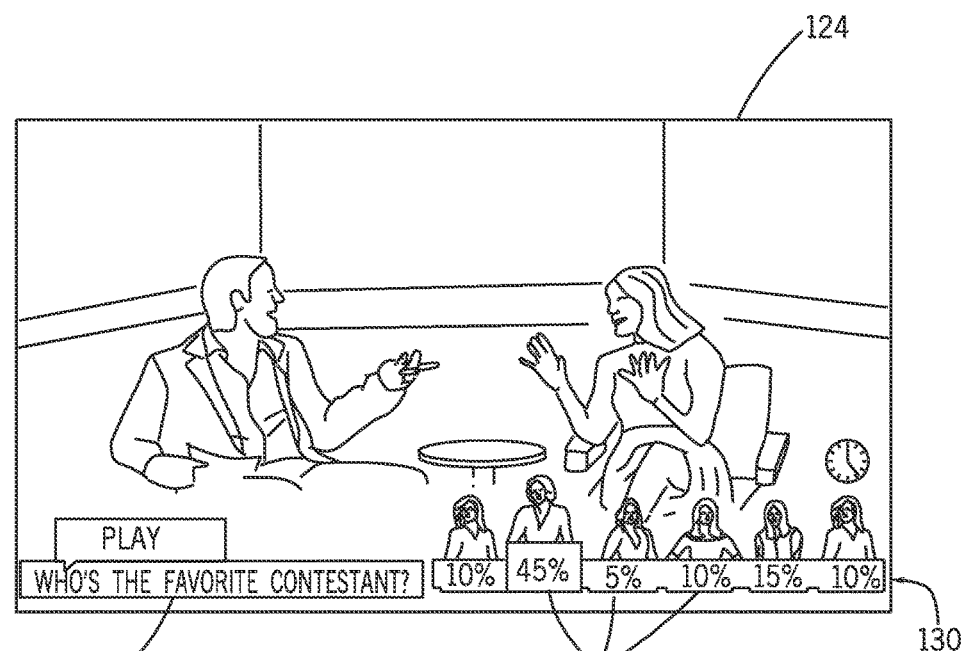

FIGS. 9-12 represent another exemplary application of the techniques for a different interactive experience. In this case, a reality or talk show is presented on a television monitor 124. Graphical indicia 126 define an invitation to participate in an interactive experience, and may provide, for example, a web address to which the secondary device should be directed for participation. As illustrated in FIG. 10, then, the graphical indicia may be altered, such as by providing a query (e.g., "Who's the favorite contestant?") that typically will be relevant to the underlying basic content of the broadcast, as indicated by reference numeral 128. Here again, a visual and/or auditory indication of time allocated for reply may be provided, which may count down to a close of the response time. In the illustrated example, illustrations of possible selections (e.g., candidate contestants) are provided to facilitate audience participation, as indicated by reference numeral 130. In this example, the graphical indicia are further altered during the broadcast and even during a response period by display of the then-current aggregated feedback percentages, and by highlighting the leading selection (e.g., by size changes), as indicated by numeral 132. Here again, such changes may be provided during the response period or after, depending upon the experience desired. In any case, it is contemplated that the altered graphical indicia will be changed during the broadcast, however.

As noted above, the present techniques also allow, where desired, for alteration of the basic content of the broadcast. That is, because audience data is collected, aggregated, and processed during the broadcast itself, the audience may be polled or asked otherwise to interact with the system in a manner that will cause the broadcaster, actors, or personalities to follow activities based on the feedback. As also noted above, for pre-recorded broadcasts, similar changes may be made based on audience participation during the broadcast. For example, multiple plot endings or twists, additional or interchangeable segments, or other interesting developments in the basic content may be prepared that are placed in the broadcast based on the audience feedback. In this sense, the disclosed techniques offer potentially exciting avenues for interactively influencing content, and it is believed that a wide range of possibilities will become available as the techniques are refined and utilized by broadcasters, writers and content designers.

Figure 11:
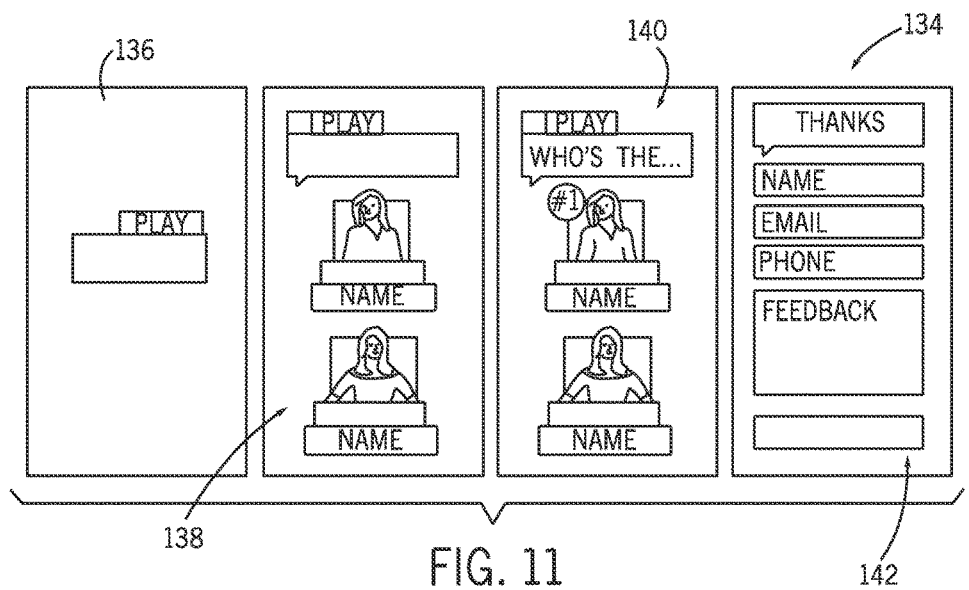

FIG. 11 illustrates corresponding pages presented on a first secondary device, in this case a smart phone 134. An initial page 136 defines the invitation to play or interact, and may present rules, sign-in fields, and the like. Page 138, then, offers a query similar to or reflecting that shown on the primary device (e.g., the television monitor). As noted above, then, the audience member may participate by selecting a response, which is transmitted back to the web host and processed with responses from other audience members. Where desired, a final or interim result may be provided on the same device, as indicated by page 140. Once complete, a page 142 may solicit user information, feedback, or any other information of interest. This aspect may be incorporated, for example, to allow for point accumulation, promotional or advertising schemes, and so forth as a result of audience participation. In such cases, the rules and storage strategies will allow for processing and recording the user or system-specific results.

Figure 12:
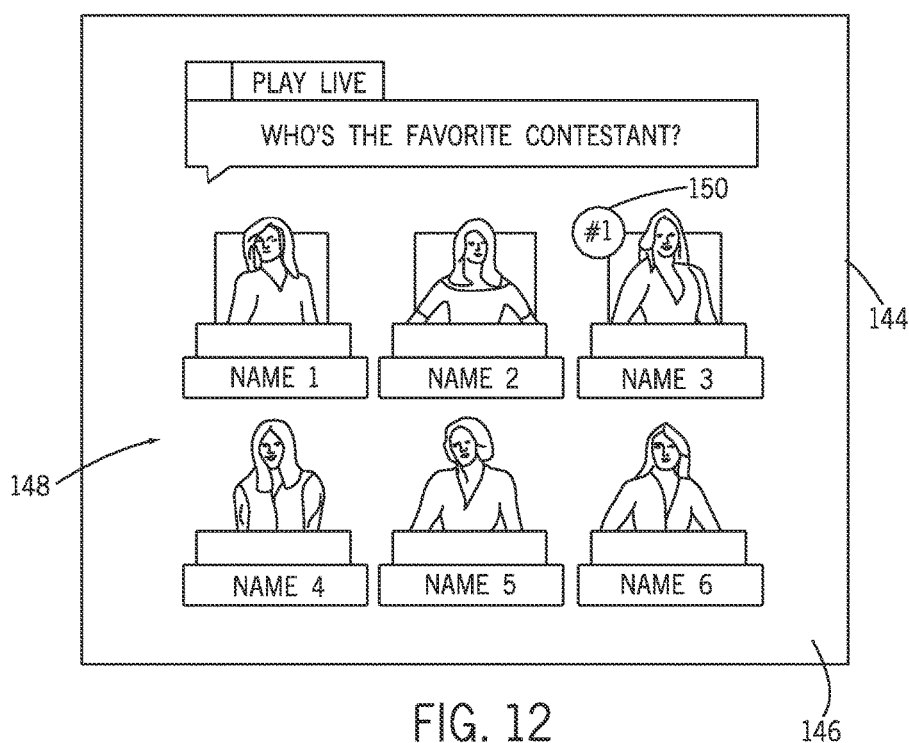

FIG. 12 similarly shows a page on a different secondary device, in this case a laptop computer 144. A page 146 is presented in this example, that includes a query and selections similar to or based on the query and selections provided on the television monitor, as indicated by reference numeral 148. In this example, a leading selection 150 is illustrated based upon audience feedback aggregation and application of the rules. As in the case of the smart phone, before or after this page certain user or system information may be selected either directly from the devices or by user input.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for exchanging digital content with an audience, comprising:
   preparing a broadcast stream comprising basic content data and graphical insert data, the basic content data being configured to allow audience playback systems to generate viewable screens at the audience playback systems, and the graphical insert data being configured to allow the audience playback systems to generate graphical indicia displayed over a portion of the viewable screens;
   transmitting the broadcast stream to the audience playback systems via a broadcast protocol;
   receiving a request from one or more secondary audience devices for interactive user interface and user exchange (UI/UX) data corresponding to the broadcast stream, wherein the one or more secondary audience devices are separate from the audience playback systems;
   transmitting, in response to the request, the interactive UI/UX data to the one or more secondary audience devices in coordination with the broadcast stream, wherein the interactive UI/UX data comprises interactive data that provides interactive content, which is synchronized with the broadcast stream, for display on the one or more secondary audience devices;
   receiving reply data from the one or more secondary audience devices, based upon an interaction with the interactive content provided for display at the one or more secondary audience devices;
   aggregating the reply data for a plurality of audience members;
   applying rules to the aggregated reply data, wherein the rules enable a determination of an advertisement promotion status based upon an audience member selection as prompted by the graphical insert data or the interactive UI/UX data; and
   altering the graphical insert data provided to the audience playback systems, based upon the applied rules and the reply data, to indicate the advertisement promotion status, wherein the advertisement promotion status indicates a discount on a subset of a set of selections provided to the one or more secondary audience devices, wherein the advertisement promotion status is based on a popularity of the subset of the set of selections.

2. The method of claim 1, wherein the basic content data and the graphical insert data are transmitted together in the same broadcast stream.

3. The method of claim 1, wherein the basic content data and the graphical insert data are transmitted separately in the broadcast stream.

4. The method of claim 1, wherein the graphical insert data is altered and transmitted during a time period that is displayed in the graphical insert data.

5. The method of claim 4, comprising including in the graphical insert data or transmitting a signal to produce an audio indication of time remaining for replies from the audience members.

6. The method of claim 1, wherein the graphical insert data is altered based upon a number of replies of a given type received from the audience members.

7. The method of claim 1, wherein the rules enable a determination of a most popular audience member selection as prompted by the graphical insert data.

8. The method of claim 1, wherein the basic content data comprises a broadcast television program transmitted based upon a preset schedule.

9. The method of claim 1, wherein the basic content data comprises a broadcast commercial.

10. The method of claim 1, wherein the graphical insert data comprises a flash stream.

11. The method of claim 1, wherein the graphical insert data prompts the audience members to vote via the one or more secondary audience devices, and wherein the altered graphical insert data provides indicia of aggregated votes.

12. The method of claim 11, wherein the altered graphical insert data is transmitted to the audience playback systems while voting replies are being accepted during a voting period.

13. The method of claim 12, comprising including in the graphical insert data or transmitting a signal to produce an audio indication of time remaining during the voting period.

14. A method for exchanging digital content with an audience, comprising:
  broadcasting at least one broadcast stream comprising basic content data and graphical insert data, the basic content data being configured to allow audience playback systems to generate viewable screens at the audience playback systems, and the graphical insert data being configured to allow the audience playback systems to generate graphical indicia displayed over a portion of the viewable screens;
  receiving a request from one or more secondary audience devices for interactive user interface and user exchange (UI/UX) data corresponding to the broadcast stream, wherein the one or more secondary audience devices are separate from the audience playback systems;
  transmitting, in response to the request, the interactive UI/UX data to the one or more secondary audience devices in coordination with the broadcast stream, wherein the interactive UI/UX data comprises interactive data that provides interactive content, which is synchronized with the broadcast stream, for display on the one or more secondary audience devices;
  receiving reply data from the one or more secondary audience devices in coordination with the broadcast of the graphical insert data, based upon an interaction with the interactive content provided for display at the one or more secondary audience devices;
  aggregating the reply data for a plurality of audience members;
  applying rules to the aggregated reply data, wherein the rules enable a determination of an advertisement promotion status based upon an audience member selection as prompted by the graphical insert data or the interactive UI/UX data;
  altering the graphical insert data provided to the audience playback systems, based upon the applied rules and the reply data, to generate altered graphical insert data that indicates the advertisement promotion status, wherein the advertisement promotion status indicates a discount on a subset of a set of selections provided to the one or more secondary audience devices, wherein the advertisement promotion status is based on a popularity of the subset of the set of selections; and
  broadcasting the altered graphical insert data to the audience playback systems during a time allowed for receiving the reply data.

15. The method of claim 14, wherein the basic content data comprises a broadcast television program transmitted based upon a preset schedule.

16. The method of claim 14, wherein the graphical insert data prompts the audience members to vote via the one or more secondary audience devices, and wherein the altered graphical insert data provides indicia of aggregated votes.

17. The method of claim 16, wherein the altered graphical insert data is transmitted to the audience playback systems while voting replies are being accepted during a voting period.

18. A system for exchanging digital content with an audience, comprising:
  a broadcaster that broadcasts at least one broadcast stream comprising basic content data and graphical insert data, the basic content data being configured to allow audience playback systems to generate viewable screens at the audience playback systems, and the graphical insert data being configured to allow the audience playback systems to generate graphical indicia displayed over a portion of the viewable screens;
  a web host that:
    receives a request from one or more secondary audience devices for interactive user interface and user exchange (UI/UX) data corresponding to the broadcast stream, wherein the one or more secondary audience devices are separate from the audience playback systems;
    transmits, in response to the request, the interactive UI/UX data to the secondary audience devices in coordination with the broadcast stream, wherein the interactive UI/UX data comprises interactive data that_provides interactive content, which is synchronized with the broadcast stream, for display on the one or more secondary audience devices; and
    receives reply data from the one or more secondary audience devices in coordination with the broadcast of the graphical insert data, based upon an interaction with the interactive content provided for display at the one or more secondary audience devices;
  a processor that aggregates the reply data for a plurality of audience members and applies rules to the aggregated reply data, wherein the rules enable a determination of an advertisement promotion status based upon an audience member selection as prompted by the graphical insert data or the interactive UI/UX data; and
  an altering component that alters the graphical insert data provided to the audience playback systems based upon the applied rules and the reply data, to generate altered graphical insert data that indicates the advertisement promotion status, wherein the advertisement promotion status indicates a discount on a subset of a set of selections provided to the one or more secondary audience devices, wherein the advertisement promotion status is based on a popularity of the subset of the set of selections;
  wherein the broadcaster broadcasts the altered graphical insert data to the audience playback systems during a time allowed for receiving the reply data.

19. The system of claim 18, wherein the broadcaster and the web host are the same entity.

20. The system of claim 18, wherein the web host and the processor are the same entity.

21. The system of claim 18, wherein the processor and the altering component are the same entity.

22. The system of claim 18, wherein the altering component and the broadcaster are the same entity.

23. The method of claim 1, wherein altering the graphical insert data based on the applied rules and the reply data comprises:
  altering, based on the applied rules and the reply data, at least one of a size or a color of one of the selections as provided to the audience playback systems in the graphical insert data; and
  altering, based on the applied rules and the reply data, at least one of an order or a position of one of the selections as provided to the one or more secondary audience devices in the interactive UI/UX data.

24. The method of claim 1, further comprising altering the interactive UI/UX data to the one or more secondary audience devices, based upon the applied rules and the reply data, to indicate the advertisement promotion status.

25. The method of claim 1, further comprising:
  determining pre-recorded content based on the reply data; and
  including the pre-recorded content in the basic content data.

26. The method of claim 25, wherein including the pre-recorded content in the basic content data comprises including extra content in the basic content data or including at least one content segment of a plurality of content segments in the basic content data.

27. The method of claim 1, wherein the one or more secondary audience devices comprise one or more smart telephones, tablet computers, laptop computers, or a combination thereof.

* * * * *